(12) United States Patent
Lehr et al.

(10) Patent No.: US 6,985,713 B2
(45) Date of Patent: Jan. 10, 2006

(54) DATA COMMUNICATION NETWORK PROVIDING POWER OVER NETWORK CONNECTIONS WITH NODE IDENTIFICATION FUNCTIONALITY

(75) Inventors: Amir Lehr, Tel Aviv (IL); Ilan Atias, Haifa (IL); Dror Korcharz, Bat Yam (IL); David Pincu, Holon (IL); Alon Ferentz, Bat Yam (IL); Yair Darshan, Petach Tikva (IL); Nadav Barnea, Or Yehuda (IL)

(73) Assignee: PowerDsine, Ltd., Hod Hasharon (IL)

( * ) Notice: Subject to any disclaimer, the term of this patent is extended or adjusted under 35 U.S.C. 154(b) by 524 days.

(21) Appl. No.: 10/198,831

(22) Filed: Jul. 18, 2002

(65) Prior Publication Data

US 2003/0036819 A1    Feb. 20, 2003

Related U.S. Application Data

(63) Continuation-in-part of application No. 09/365,584, filed on Aug. 2, 1999, now Pat. No. 6,473,608, and a continuation-in-part of application No. 09/293,343, filed on Apr. 16, 1999, now Pat. No. 6,643,566.

(60) Provisional application No. 60/115,628, filed on Jan. 12, 1999.

(51) Int. Cl.
*H04B 1/00*    (2006.01)

(52) U.S. Cl. .................... 455/343.5; 713/300

(58) Field of Classification Search ........... 455/423, 455/424, 522, 69, 574, 343.2, 343.5, 343; 370/241, 252, 245; 700/300

See application file for complete search history.

(56) References Cited

U.S. PATENT DOCUMENTS

| | | | |
|---|---|---|---|
| 3,423,521 A | 1/1969 | Friesen et al. |
| 3,500,132 A | 3/1970 | Garrett |
| 4,101,878 A | 7/1978 | Shimizu et al. |
| 4,290,056 A | 9/1981 | Chow |
| 4,367,455 A | 1/1983 | Fried |
| 4,467,314 A | 8/1984 | Weikel et al. |
| 4,528,667 A | 7/1985 | Fruhauf |
| 4,692,761 A | 9/1987 | Robinton |
| 4,731,810 A | 3/1988 | Watkins |
| 4,733,389 A | 3/1988 | Puvogel |
| 4,755,792 A | 7/1988 | Pezzolo et al. |
| 4,799,211 A | 1/1989 | Felker et al. |
| 4,815,106 A | 3/1989 | Propp et al. |
| 4,885,563 A | 12/1989 | Johnson et al. |
| 4,903,006 A | 2/1990 | Boomgaard |
| 4,926,158 A | 5/1990 | Zeigler |
| 4,973,954 A | 11/1990 | Schwartz |
| 4,992,774 A | 2/1991 | McCullough |

(Continued)

FOREIGN PATENT DOCUMENTS

WO    WO 92/17968    10/1992

(Continued)

*Primary Examiner*—Nick Corsaro
(74) *Attorney, Agent, or Firm*—Kahn Simon

(57) ABSTRACT

This invention discloses a data communications network including at least one hub, a plurality of nodes connected via network connections to the hub, a power distribution subsystem operative to provide at least some power to at least some of the plurality of nodes via at least some of the network connections. The power distribution subsystem includes a node identification functionality providing identification of nodes via at least some of the plurality of network connections in order to enable an appropriate supply of power to individual nodes and a power supply responsive to the node identification functionality and supplying power to the at least some of the plurality of nodes via the at least some of the network connections.

12 Claims, 11 Drawing Sheets

U.S. PATENT DOCUMENTS

| | | |
|---|---|---|
| 5,003,457 A | 3/1991 | Ikei et al. |
| 5,021,779 A | 6/1991 | Bisak |
| 5,032,833 A | 7/1991 | Laporte |
| 5,033,112 A | 7/1991 | Bowling et al. |
| 5,066,939 A | 11/1991 | Mansfield, Jr. |
| 5,093,828 A | 3/1992 | Braun et al. |
| 5,148,144 A | 9/1992 | Sutterlin et al. |
| 5,192,231 A | 3/1993 | Dolin, Jr. |
| 5,306,956 A | 4/1994 | Ikeda et al. |
| 5,351,272 A | 9/1994 | Abraham |
| 5,406,260 A | 4/1995 | Cummings et al. |
| 5,422,519 A | 6/1995 | Russell |
| 5,452,344 A | 9/1995 | Larson |
| 5,455,467 A | 10/1995 | Yount et al. |
| 5,467,384 A | 11/1995 | Skinner, Sr. |
| 5,477,091 A | 12/1995 | Fiorina et al. |
| 5,491,463 A | 2/1996 | Sargeant et al. |
| 5,498,911 A | 3/1996 | Bossler |
| 5,517,172 A | 5/1996 | Chiu |
| 5,572,182 A | 11/1996 | De Pinho Filho |
| 5,652,893 A | 7/1997 | Ben-Meir et al. |
| 5,664,002 A | 9/1997 | Skinner, Sr. |
| 5,675,813 A | 10/1997 | Holmdahl |
| 5,684,826 A | 11/1997 | Ratner |
| 5,686,826 A | 11/1997 | Kurtz et al. |
| 5,689,230 A | 11/1997 | Merwin et al. |
| 5,742,833 A * | 4/1998 | Dea et al. .................. 713/323 |
| 5,761,084 A * | 6/1998 | Edwards ..................... 700/293 |
| 5,799,196 A | 8/1998 | Flannery |
| 5,810,606 A | 9/1998 | Ballast et al. |
| 5,814,900 A | 9/1998 | Esser et al. |
| 5,828,293 A | 10/1998 | Rickard |
| 5,835,005 A | 11/1998 | Furukawa et al. |
| 5,859,584 A | 1/1999 | Counsell et al. |
| 5,859,596 A | 1/1999 | McRae |
| 5,884,086 A | 3/1999 | Amoni et al. |
| 5,923,363 A | 7/1999 | Elberbaum |
| 5,933,073 A | 8/1999 | Shuey |
| 5,939,801 A * | 8/1999 | Bouffard et al. .............. 307/65 |
| 5,944,831 A | 8/1999 | Pate et al. |
| 5,960,208 A | 9/1999 | Obata et al. |
| 5,991,885 A * | 11/1999 | Chang et al. ................ 713/300 |
| 5,994,998 A | 11/1999 | Fisher et al. |
| 6,033,101 A | 3/2000 | Reddick et al. |
| 6,038,457 A * | 3/2000 | Barkat ...................... 455/556.1 |
| 6,049,881 A | 4/2000 | Massman et al. |
| 6,095,867 A | 8/2000 | Brandt et al. |
| 6,115,468 A | 9/2000 | De Nicolo |
| 6,125,448 A | 9/2000 | Schwan et al. |
| 6,140,911 A | 10/2000 | Fisher et al. |
| 6,218,930 B1 | 4/2001 | Katzenberg et al. |
| 6,243,818 B1 | 6/2001 | Schwan et al. |
| 6,301,527 B1 | 10/2001 | Butland |
| 6,329,906 B1 | 12/2001 | Fisher et al. |
| 6,377,874 B1 | 4/2002 | Ykema |
| 6,393,607 B1 | 5/2002 | Hughes et al. |
| 6,473,608 B1 | 10/2002 | Lehr et al. |
| 6,480,510 B1 | 11/2002 | Binder |
| 6,496,103 B1 | 12/2002 | Weiss et al. |
| 6,496,105 B2 | 12/2002 | Fisher et al. |
| 6,535,983 B1 | 3/2003 | McCormack et al. ........ 713/310 |
| 6,603,220 B2 | 8/2003 | Vergnaud |
| 6,701,443 B1 | 3/2004 | Bell ......................... 713/300 |
| 6,753,761 B2 | 6/2004 | Fisher et al. |
| 6,804,351 B1 | 10/2004 | Karam ....................... 379/413 |
| 6,874,093 B2 | 3/2005 | Bell ........................... 713/300 |
| 2003/0058085 A1 | 3/2003 | Fisher et al. |

FOREIGN PATENT DOCUMENTS

| | | |
|---|---|---|
| WO | WO 96/23377 A1 | 8/1996 |
| WO | WO 00/41496 | 7/2000 |

* cited by examiner

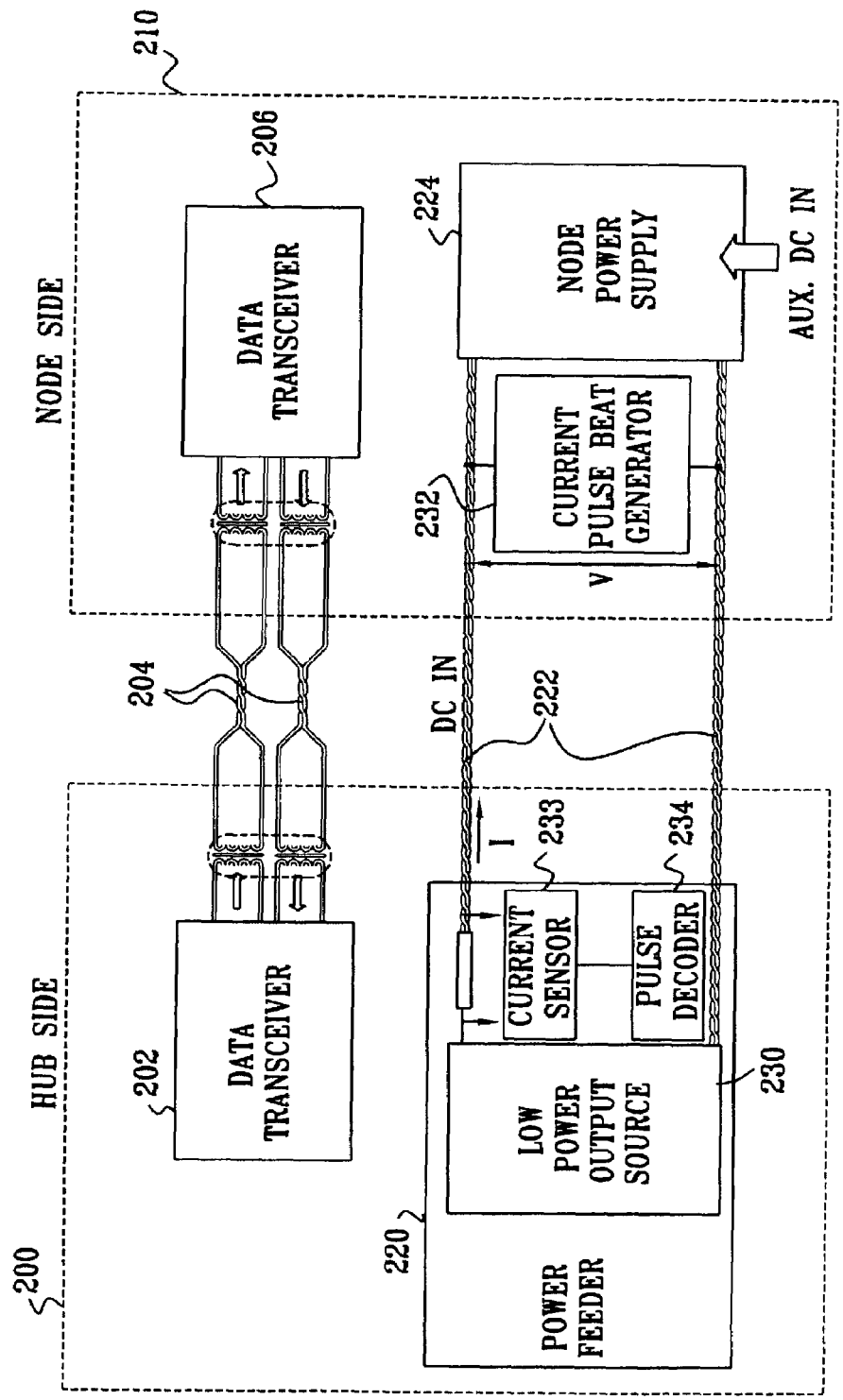

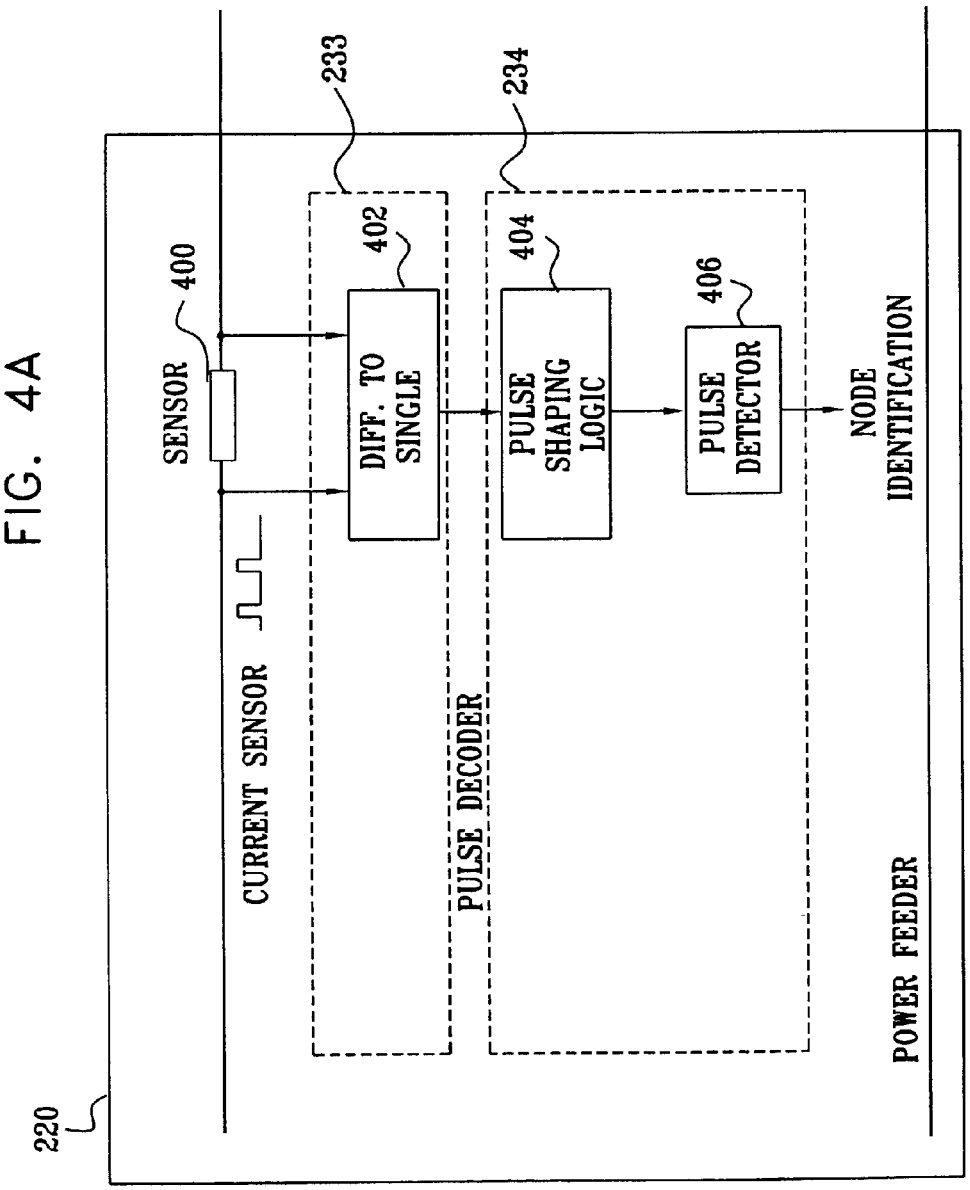

US 6,985,713 B2

DATA COMMUNICATION NETWORK PROVIDING POWER OVER NETWORK CONNECTIONS WITH NODE IDENTIFICATION FUNCTIONALITY

CROSS-REFERENCE TO RELATED APPLICATIONS

This application is a continuation-in-part of U.S. patent application Ser. No. 09/365,584 filed Aug. 2, 1999 now U.S. Pat. No. 6,473,608 which is a continuation-in-part of U.S. patent application Ser. No. 09/293,343 filed Apr. 16, 1999 now U.S. Pat. No. 6,643,566 which claims priority from U.S. Provisional Patent Application Ser. No. 60/115,628 filed Jan. 12, 1999. This application further claims priority from PCT patent application PCT/IL01/00046 filed Jan. 18, 2001.

FIELD OF THE INVENTION

The present invention relates to data communication networks generally and more particularly to systems and functionalities for power distribution over data networks.

BACKGROUND OF THE INVENTION

The following U.S. patents and published PCT Patent Applications are believed to represent the current state of the art in the field of the invention:

U.S. Pat. Nos. 6,095,867; 6,049,881; 5,994,998; 5,960,208; 5,944,831; 5,933,073; 5,923,363; 5,859,596; 5,859,584; 5,835,005; 5,828,293; 5,814,900; 5,810,606; 5,799,196; 5,689,230; 5,686,826; 5,684,826; 5,664,002; 5,572,182; 5,517,172; 5,498,911; 5,491,463; 5,477,091; 5,467,384; 5,455,467; 5,452,344; 5,422,519; 5,406,260; 5,351,272; 5,306,956; 5,192,231; 5,148,144; 5,093,828; 5,066,939; 5,033,112; 5,032,833; 5,021,779; 5,003,457; 4,992,774; 4,973,954; 4,926,158; 4,903,006; 4,885,563; 4,815,106; 4,799,211; 4,755,792; 4,733,389; 4,731,810; 4,692,761; 4,528,667; 4,467,314; 4,367,455; 4,290,056; 4,101,878; 3,500,132; 3,423,521.

Published PCT Patent Applications WO96/23377 and WO92/17968.

The most important reference is believed to be (3Com) U.S. Pat. No. 5,994,998.

The disclosures of the above patent documents and of copending U.S. Ser. No. 09/365,584, Published PCT Application PCT/IL99/00691—WO 00/41496 and of all other patent documents and publications mentioned in this specification are hereby incorporated by reference.

SUMMARY OF THE INVENTION

The present invention seeks to provide an improved data communications network having power distribution thereover and functionality for providing power distribution over data networks.

The network, apparatus and methods described herein are particularly useful in conjunction with the technology described in copending U.S. Ser. No. 09/365,584 (Published PCT Application PCT/IL99/00691—WO 00/41496).

There is thus provided in accordance with a preferred embodiment of the present invention a data communications network including at least one hub, a plurality of nodes connected via network connections to the hub, a power distribution subsystem operative to provide at least some power to at least some of the plurality of nodes via at least some of the network connections. The power distribution subsystem includes a node identification functionality providing identification of nodes via at least some of the plurality of network connections in order to enable an appropriate supply of power to individual nodes and a power supply responsive to the node identification functionality and supplying power to at least some of the plurality of nodes via at least some of the network connections.

There is provided in accordance with another preferred embodiment of the present invention a method for supplying power to a data communications network. The method includes providing at least one hub and a plurality of nodes connected via network connections to the hub, providing at least some power to at least some of the plurality of nodes via at least some of the network connections. The method further includes providing identification of nodes via at least some of the plurality of network connections in order to avoid inappropriate supply of power to individual nodes and in response to the node identification, supplying power to at least some of the plurality of nodes via the at least some of the network connections.

Further in accordance with a preferred embodiment of the present invention, the data communications network also includes node-specific power allocation functionality, which is operative, responsive to an output from the node identification functionality, to provide power only to nodes identified to be appropriate for receiving power via at least some of the network connections, thereby to prevent inappropriate supply of power to inappropriate nodes.

Still further in accordance with a preferred embodiment of the present invention, the data communications network also includes node-specific power allocation functionality, which is operative, responsive to an output from the node identification functionality, to provide power to nodes in accordance with a predetermined priority.

Additionally in accordance with a preferred embodiment of the present invention, the node identification functionality employs coded communication along the network connections.

Moreover in accordance with a preferred embodiment of the present invention, the node identification functionality employs communication of at least one electrical characteristic of at least one node from the node along at least one network connection. Preferably, the node identification functionality employs communication of at least one electrical characteristic of at least one node from the node along at least one network connection, prior to supply of operating power to the node.

Further in accordance with a preferred embodiment of the present invention, the node identification functionality employs remote measurement of at least one electrical characteristic of at least one node along at least one network connection.

Still further in accordance with a preferred embodiment of the present invention, the node identification functionality employs remote measurement of at least one electrical characteristic of at least one node along at least one network connection, prior to supply of operating power to the node.

Additionally in accordance with a preferred embodiment of the present invention, the node coded communication is initiated by supply of an electrical signal to at least one of the plurality of nodes via at least one of the network connections.

Preferably, the coded communication is produced by modulation of the electrical signal at a node. Alternatively, the coded communication is produced as a modulated response to the electrical signal.

Still further in accordance with a preferred embodiment of the present invention, the coded communication is achieved by operation of an on-off switch at the node, which produces predetermined modulation of the electrical signal, the modulated electrical signal being transmitted along at least one of the network connections.

Further in accordance with a preferred embodiment of the present invention, the node identification functionality is disabled following operation thereof. Preferably, the node identification functionality is periodically enabled following disabling thereof.

There is also provided in accordance with another preferred embodiment of the present invention for use in a data communications network, which includes at least one hub, a plurality of nodes connected via network connections to the hub and a power distribution subsystem operative to provide at least some power to at least some of the plurality of nodes via at least some of the network connections, a node-resident node identification functionality providing identification of a node via at least some of the plurality of network connections in order to avoid inappropriate supply of power to a node.

Further in accordance with a preferred embodiment of the present invention, the node-resident node identification functionality also includes at least one electrical circuit element which has no function in the node other than as part of the node-resident node identification functionality.

Still further in accordance with a preferred embodiment of the present invention, the electrical circuit element comprises a resistor. Alternatively the electrical circuit element includes an electrical switch.

Further in accordance with a preferred embodiment of the present invention, the node-resident node identification functionality is disabled following operation thereof. Alternatively the node-resident node identification functionality is periodically enabled following disabling thereof.

There is further provided in accordance with a preferred embodiment of the present invention a data communications network including at least one hub, a plurality of nodes connected via network connections to the hub, a power distribution subsystem operative to provide at least some power to at least some of the plurality of nodes via at least some of the network connections and a node identification functionality providing identification of nodes via at least some of the plurality of network connections which carry power.

Further in accordance with a preferred embodiment of the present invention, the node identification functionality is capable of providing more than two different identification indications.

Still further in accordance with a preferred embodiment of the present invention, the node identification functionality is capable of providing at least one identification indication which varies depending on a current status of at least one node.

There is also provided in accordance with yet another preferred embodiment of the present invention a data communications network including at least one hub, a plurality of nodes connected via network connections to the hub, a power distribution subsystem operative to provide at least some power to at least some of the plurality of nodes via at least some of the network connections. The power distribution subsystem includes a node identification functionality providing identification of more than two types of nodes via at least some of the plurality of network connections in order to fulfill more than two different power requirements corresponding to more than two types of nodes and a power supply responsive to the node identification functionality and supplying power to at least some of the plurality of nodes via at least some of said network connections.

There is provided in accordance with a further embodiment of the present invention a data communications network including at least one hub, a plurality of nodes connected via network connections to the hub, a power distribution subsystem operative to provide at least some power to at least some of the plurality of nodes via at least some of the network connections. The power distribution subsystem includes a node identification functionality providing identification of a plurality of types of dynamic node status via at least some of the plurality of network connections in order to fulfill dynamically varying power requirements corresponding to the plurality of types of dynamic node status and a power supply responsive to the node identification functionality and supplying power to at least some of the plurality of nodes via at least some of the network connections.

BRIEF DESCRIPTION OF THE DRAWINGS

The present invention will be understood and appreciated more fully from the following detailed description, taken in conjunction with the drawings in which:

FIG. 2 is a simplified functional block diagram of one preferred embodiment of a data communication network including a power distribution functionality;

FIGS. 4A and 4B are simplified functional block diagram illustrations of embodiments of pulse decoder functionality employed in the embodiment of FIG. 2 for use with the current pulse beat functionalities of FIGS. 3A and 3B respectively;

DETAILED DESCRIPTION OF PREFERRED EMBODIMENTS

Figure 1:
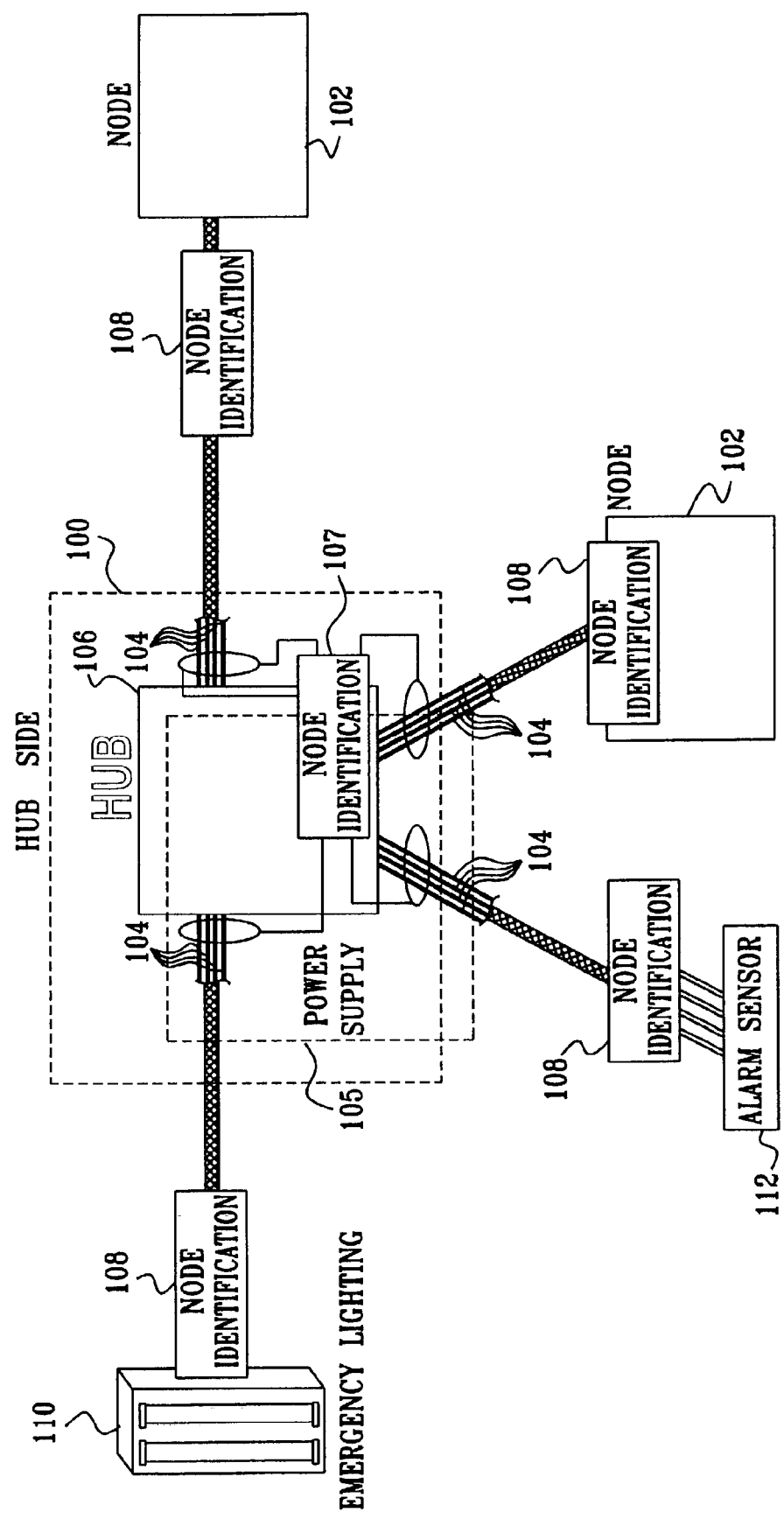
FIG. 1 is a simplified functional block diagram of a data communication network including a power distribution functionality in accordance with a preferred embodiment of the present invention.

Reference is now made to FIG. 1, which is a simplified functional block diagram of a data communication network including a power distribution functionality in accordance with a preferred embodiment of the present invention. As seen in FIG. 1, the data communication network preferably includes a hub side 100 and a plurality of nodes 102 which are connected to the hub side 100 via network connections 104, typically including four parallel twisted pairs of copper wire, as shown, in accordance with ANSI Standard ANSI/EIA/TIA 568A.

The data communication network includes a power supply 105 which may or may not be at the hub side for providing power to individual nodes 102 via the network connections 104. When the power supply 105 is at the hub side, it may or may not be located at a hub 106 or may be partially at the hub 106.

In accordance with a preferred embodiment of the present invention there is provided hub side node identification functionality 107 which preferably operates in conjunction with node side node identification functionality 108. Hub side node identification functionality 107 may or may not be located at hub 106 or may be partially located at the hub 106. Hub side node identification functionality 107 may or may not be located at power supply 105 or may be partially located at power supply 105.

It is a particular feature of the present invention that the node identification functionality is employed for governing the supply of electrical power from power supply 105 to individual nodes 102 via the network connections 104.

The node identification functionality 108 may employ active node side active identification functionality, which transmits an identification indication to hub side identification functionality 107. Such an embodiment is shown in FIG. 2.

Figure 5:
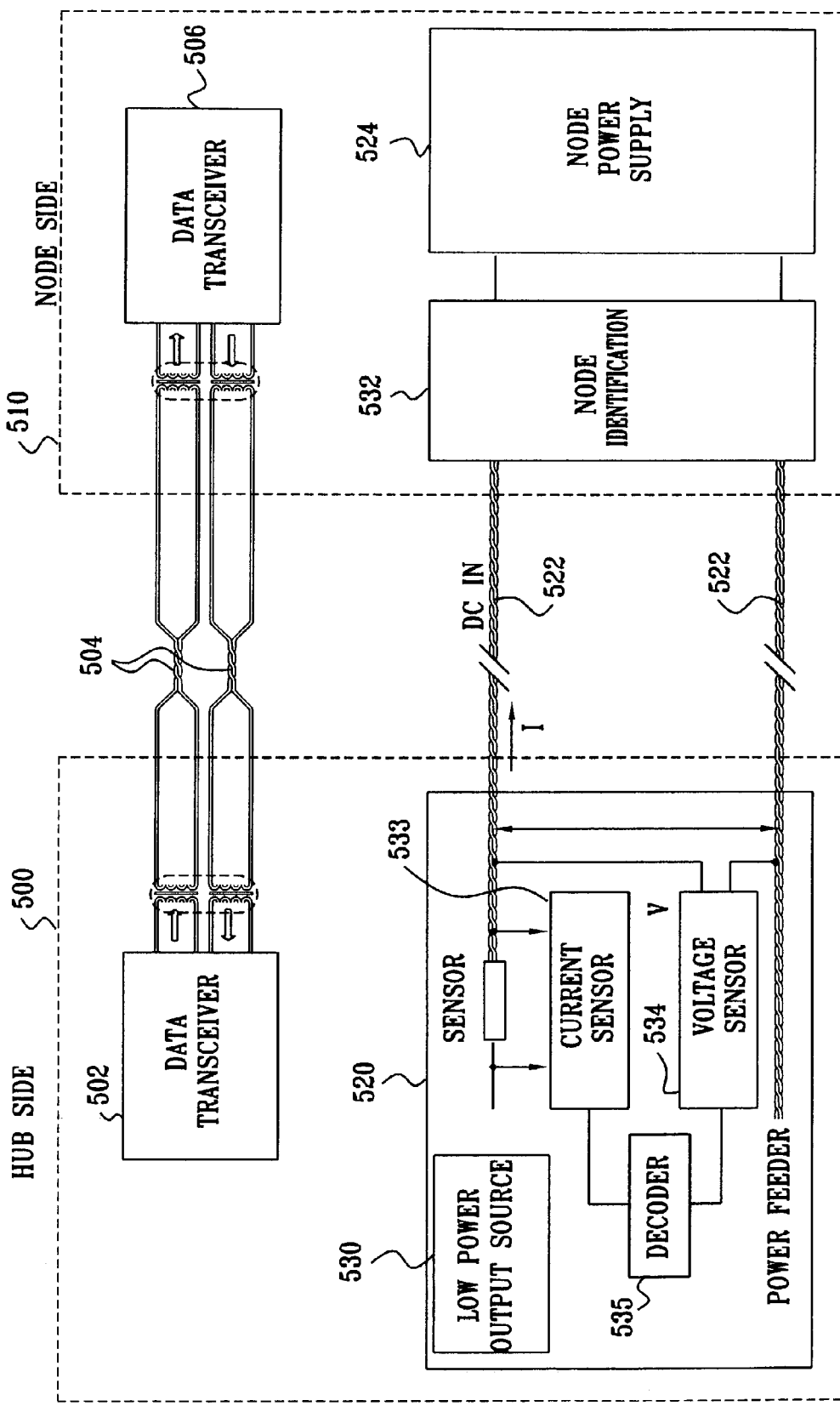
FIG. 5 is a simplified functional block diagram of one preferred embodiment of a data communication network including a power distribution functionality.

Alternatively, the node identification functionality 108 may employ passive node side identification functionality, which may be interrogated by the hub side identification functionality 107. Such an embodiment is shown in FIG. 5.

Node side node identification functionality 108 may or may not be located at node 102 or may be partially located at the node 102.

One important application of the node identification functionality is to prevent inappropriate supply of power to inappropriate nodes. Another important application of the node identification functionality, which may be in addition or alternative to the above application, is prioritizing supply of electrical power to individual nodes.

As described in applicants Published PCT Application WO 00/41496, power may be transmitted over spare twisted wire pairs which do not currently carry data communications. Additionally or alternatively, power may be transmitted over twisted wire pairs, which do currently carry data communications, such as, for example in Gigabit Ethernet applications.

It is noted that node side node identification functionality 108 may provide any suitable number of different identification outputs. Thus it may enable many different types of nodes to be distinguished from each other at the hub side. For example, there may be nodes which are not suitable for receiving power over the network as well as various types of nodes which require various levels of power and which are assigned various priorities for supply of power thereto.

Examples of such nodes are an emergency lighting node 110 which typically requires a power input of 48 Volts at 100 mA. and an alarm sensor node 112, which typically requires a power input 24 Volts at 20 mA. The emergency lighting node 110 may have a higher priority than the alarm sensor node 112. It is appreciated that each node having either a different power requirement or a different priority may have a different identification.

Figure 6:
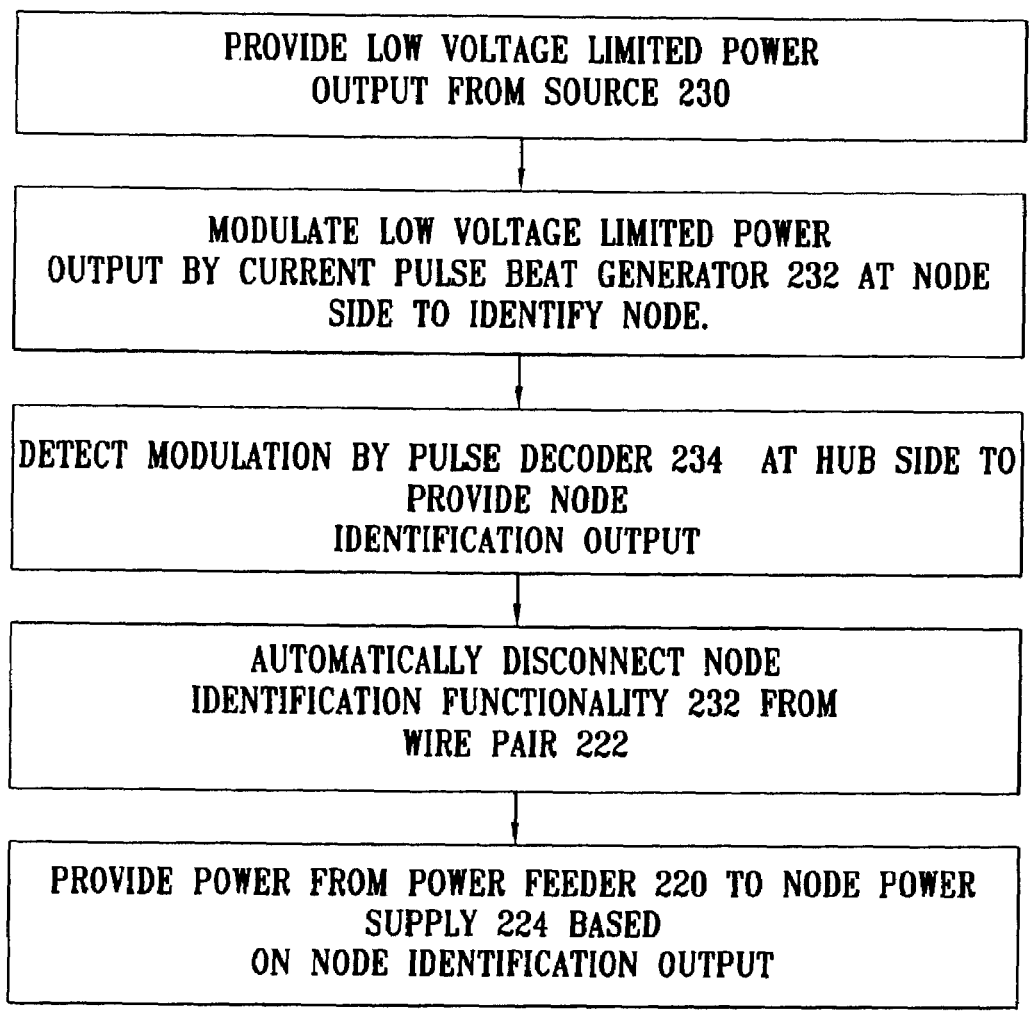
FIG. 6 is a simplified flow chart illustrating the operation of a apparatus of FIG. 2.

Reference is now made to FIG. 2, which is a simplified functional block diagram of one preferred embodiment of a data communication network including a power distribution functionally and to FIG. 6 which is a flowchart illustrating the operation thereof. As seen in FIG. 2, at a hub side, designated by reference numeral 200, there is provided at least one data transceiver 202, which communicates typically via at least two pairs of twisted copper wire 204 with a corresponding at least one data transceiver 206 located at a node side 210.

In accordance with a preferred embodiment of the present invention, at least one power feeder 220 typically is located at the hub side 200 and communicates via at least two pairs of twisted copper wire 222 with a node power supply 224 located at a node side 210. As noted above, it is a particular feature of the present invention that each node is identified to the power feeder so as to ensure that the proper power is supplied thereto.

As seen also in FIG. 6, in the embodiment of FIG. 2 identification of a node, such as that represented by node side 210 is achieved by providing a low voltage, limited power, output from a low power output source 230 at the hub side 200 to the node side 210 over wire pairs 222. Node identification functionality, preferably embodied in a current pulse beat generator 232, located at the node side 210, modulates the low voltage, limited power, output, in a manner which identifies the node. This modulation is detected by a current sensor 233, which outputs to a pulse decoder 234 at the hub side, which in turn provides a node identification output to the power feeder 220. The power feeder 220 provides power to the node power supply 224 in response to receipt of the node identification output.

In accordance with a preferred embodiment of the present invention, following provision of the node identification output and concurrently with or prior to supply of power to the node power supply 224, the node identification functionality, here the current pulse beat generator 232, is automatically disconnected from wire pairs 222.

Figure 3A:
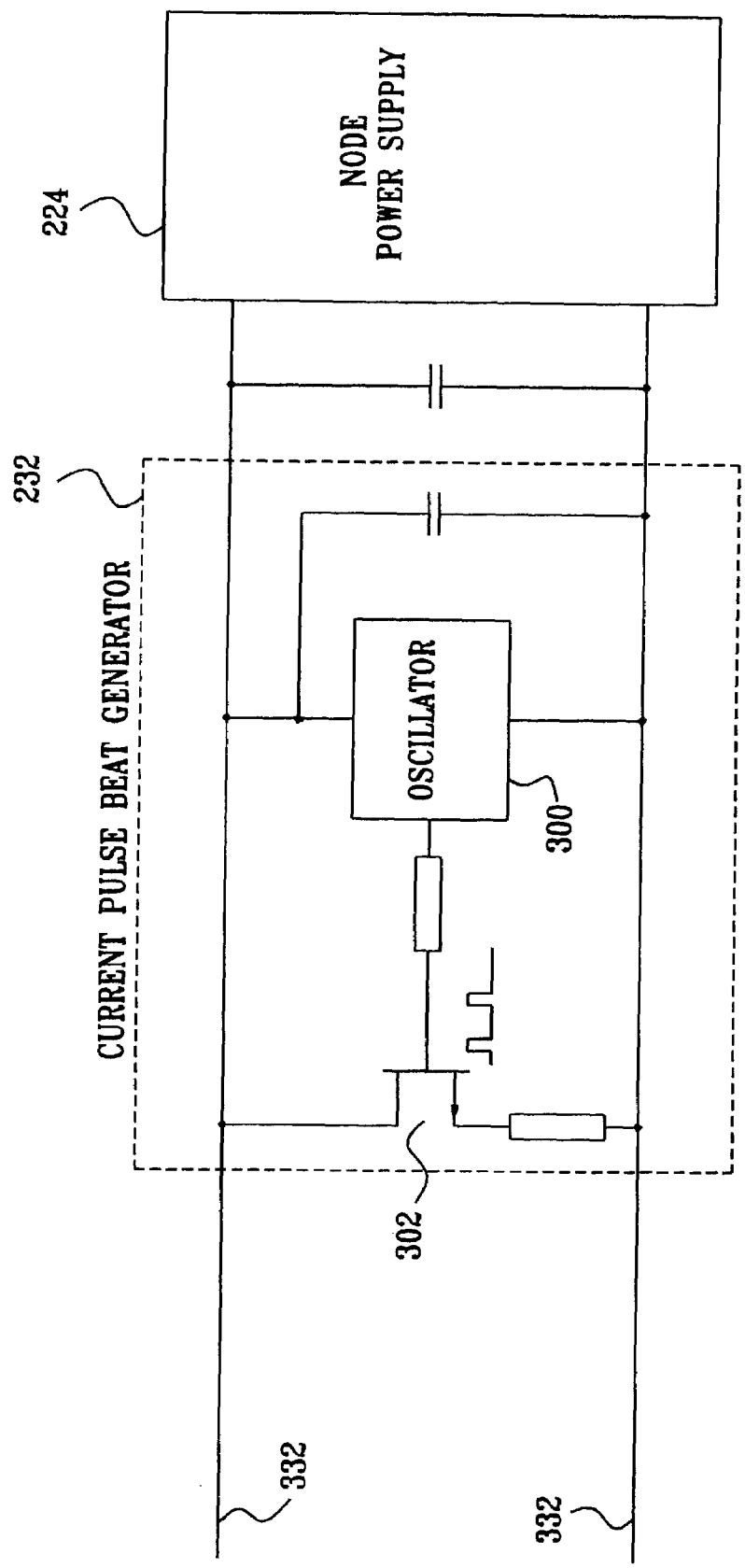
FIGS. 3A and 3B are simplified functional block diagrams of two alternative embodiments of current pulse beat functionality employed in the embodiment of FIG. 2.
Figure 3B:
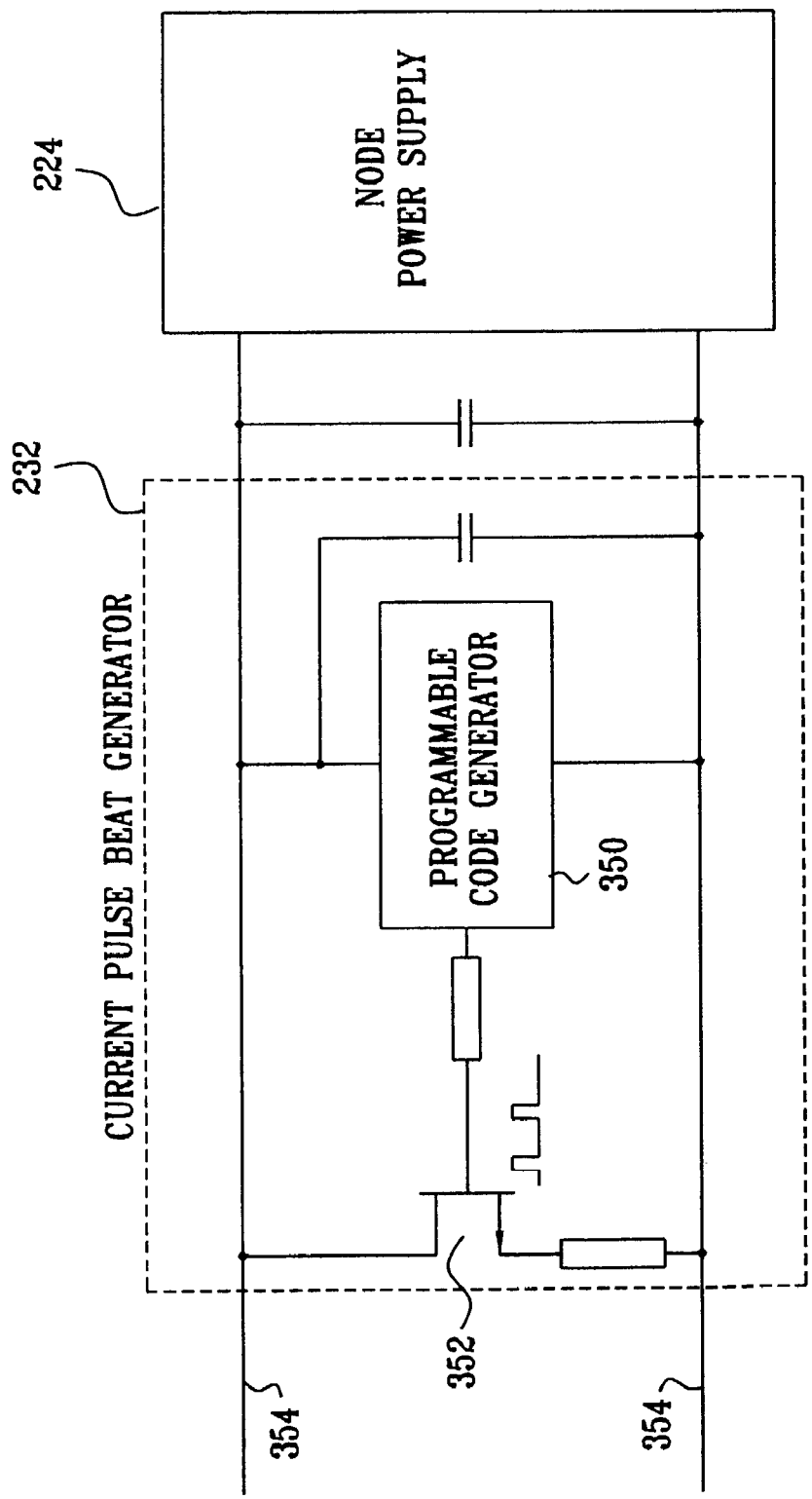

Reference is now made to FIGS. 3A and 3B, which are simplified functional block diagrams of two alternative embodiments of current pulse beat functionality employed by current pulse beat generator 232 which is connected to node power supply 224 in the embodiment of FIG. 2. Turning to FIG. 3A, it is seen that an oscillator 300 drives a FET 302 to modulate the current along wire pairs 332, which correspond to wire pairs 222 in FIG. 2. This modulation is decoded by the decoder 234 at the hub side 200 as shown in FIG. 2.

Turning to FIG. 3B, it is seen that a programmable code generator 350 drives a FET 352 to modulate the current along wire pairs 354, which correspond to wire pairs 222 in FIG. 2. This modulation is decoded by the decoder 234 at the hub side 200 as shown in FIG. 2.

Figure 4B:
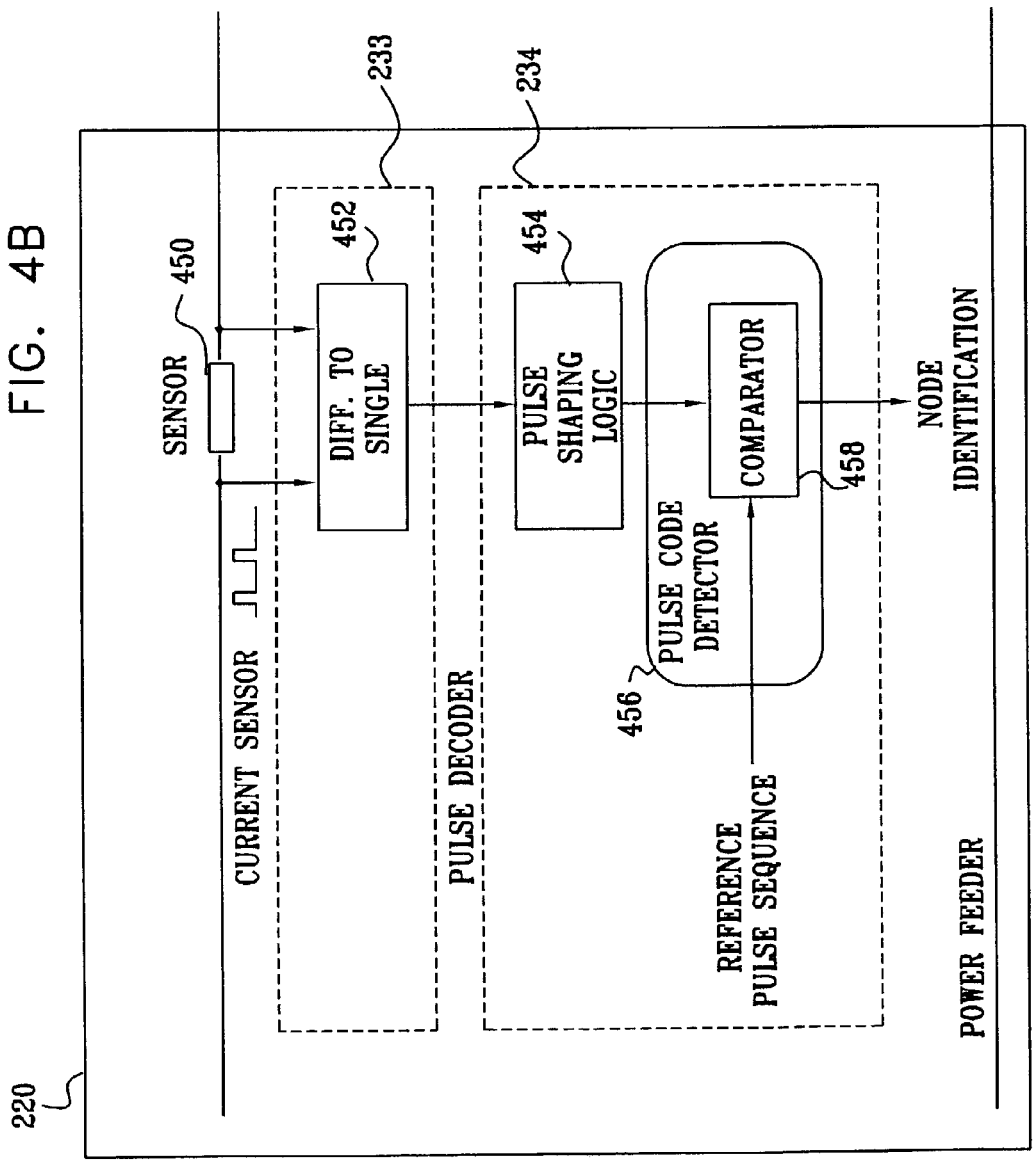

Reference is now made to FIGS. 4A and 4B, which are simplified functional block diagrams of embodiments of current sensor and pulse decoder functionality preferably employed by current sensor 233 and pulse decoder 234 in the embodiment of FIG. 2 when use with pulse beat generators as shown in FIGS. 3A and 3B respectively.

As seen in FIG. 4A, taps on opposite sides of a resistive sensor 400, such as a series sampling resistor, are coupled to inputs of an operational amplifier 402, which converts the differential pulse signal provided by the inputs to a single channel output referenced to ground. This single channel output is supplied to pulse shaping logic 404 and thence to a pulse detector 406, which provides a node identification output to the power feeder 220.

As seen in FIG. 4B, taps on opposite sides of a resistive sensor 450, such as a series sampling resistor, are coupled to inputs of an operational amplifier 452, which converts the differential pulse signal provided by the inputs to a single channel output referenced to ground. This single channel output is supplied to pulse shaping logic 454 and thence to pulse code detector 456, which includes a comparator 458, which compares received pulses with a reference pulse sequence, which may be pre-programmed. The pulse code detector 456 provides a node identification output to the power feeder 220.

Figure 7:
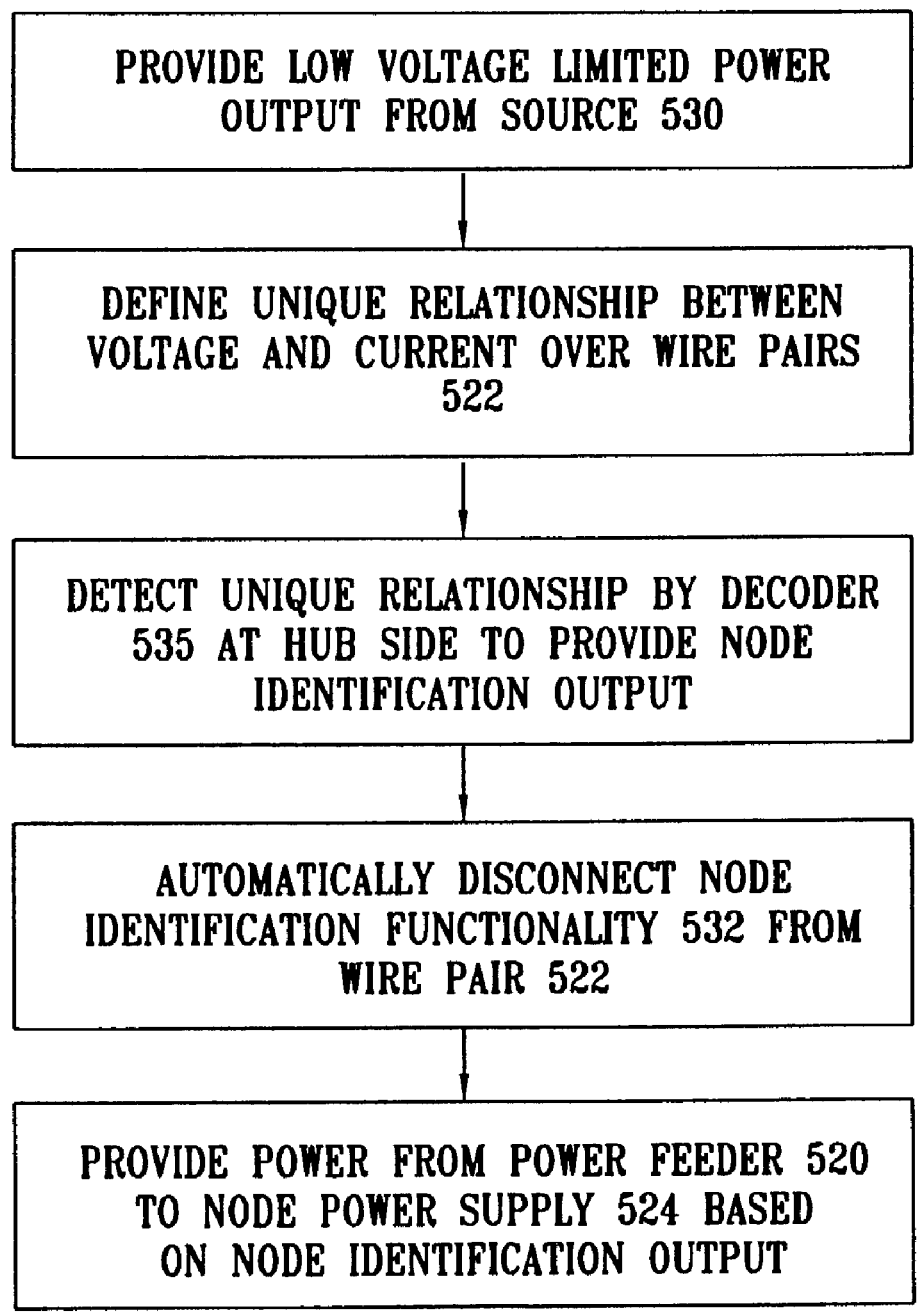
FIG. 7 is a simplified flow chart illustrating the operation of a decoder and node identification forming part of the power feeder and node side respectively of the data communication network including a power distribution functionality of FIG. 5.

Reference is now made to FIG. 5, which is a simplified functional block diagram of one preferred embodiment of a data communication network including a power distribution functionality and to FIG. 7, which is a flowchart illustrating the operation thereof. As seen in FIG. 5, at a hub side, designated by reference numeral 500, there is provided at least one data transceiver 502, which communicates typically via at least two pairs of twisted copper wire 504 with a corresponding at least one data transceiver 506 located at a node side 510.

In accordance with a preferred embodiment of the present invention, at least one power feeder 520 typically is located at the hub side 500 and communicates via at least two pairs of twisted copper wire 522 with a node power supply 524 located at a node side. As noted above, it is a particular feature of the present invention that each node is identified to the power feeder so as to ensure that the proper power is supplied thereto.

As seen also in FIG. 7, in the embodiment of FIG. 5 identification of a node, such as that represented by node side 510, is achieved by providing a low voltage, limited power, output from a low power output source 530 at the hub side 500 to the node side 510 over wire pairs 522. A node identification functionality 532, preferably located at the node side 510, preferably comprises a precise resistor which defines a unique relationship between voltage and current over wire pairs 522. This relationship preferably is detected by a current sensor 533 and by a voltage sensor 534, both of which output to a decoder 535 at the hub side 500, which provides a node identification output to the power feeder 520. The power feeder 520 provides power to the node power supply 524 in response to receipt of the node identification output.

In accordance with a preferred embodiment of the present invention, following provision of the node identification output and concurrently with or prior to supply of power to the node power supply 524, the node identification functionality 532 is automatically disconnected from wire pairs 522.

Figure 8:
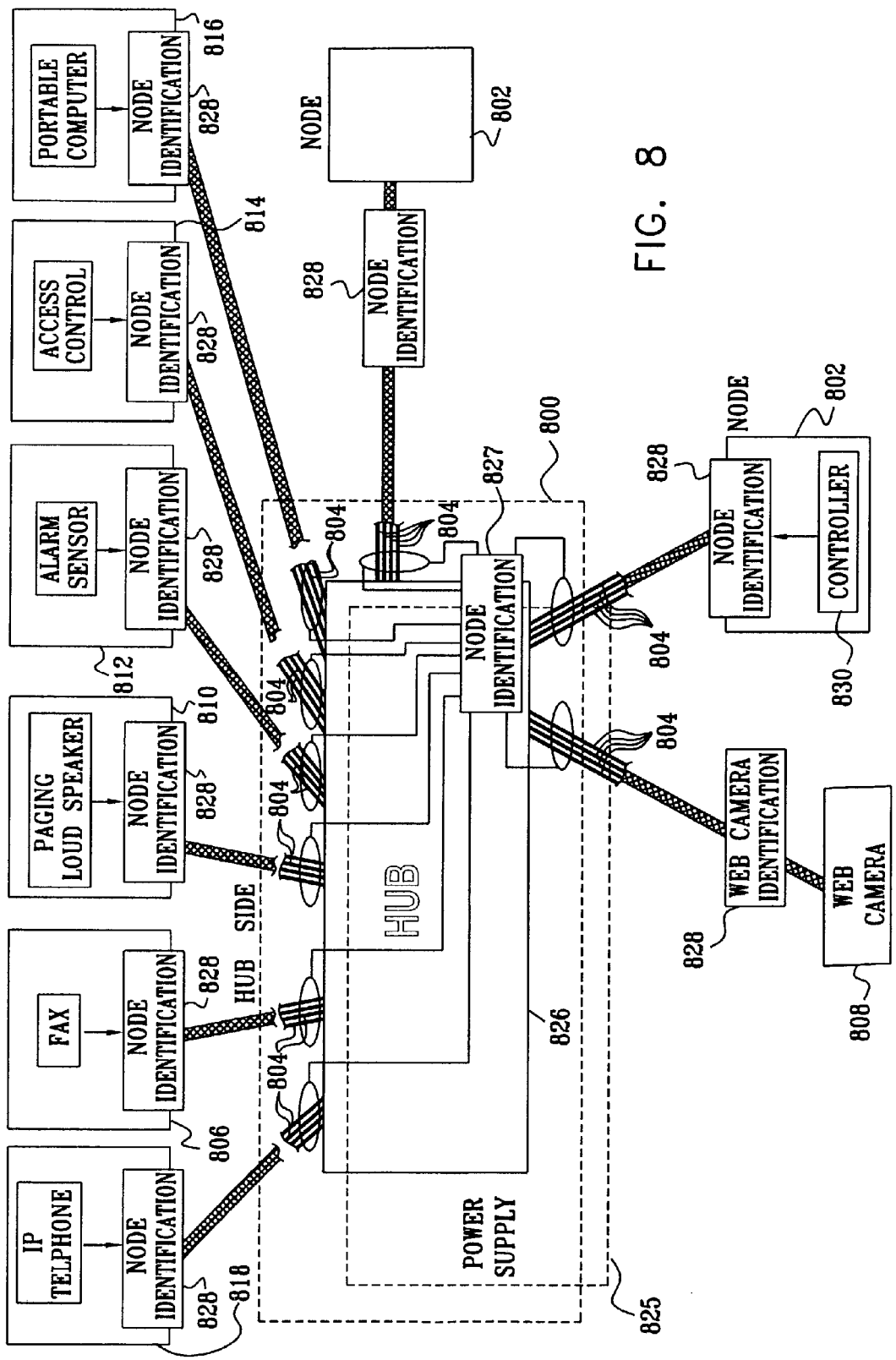
FIG. 8 is a simplified functional block diagram of a data communication network including a power distribution functionality in accordance with another preferred embodiment of the present invention.
Figure 9:
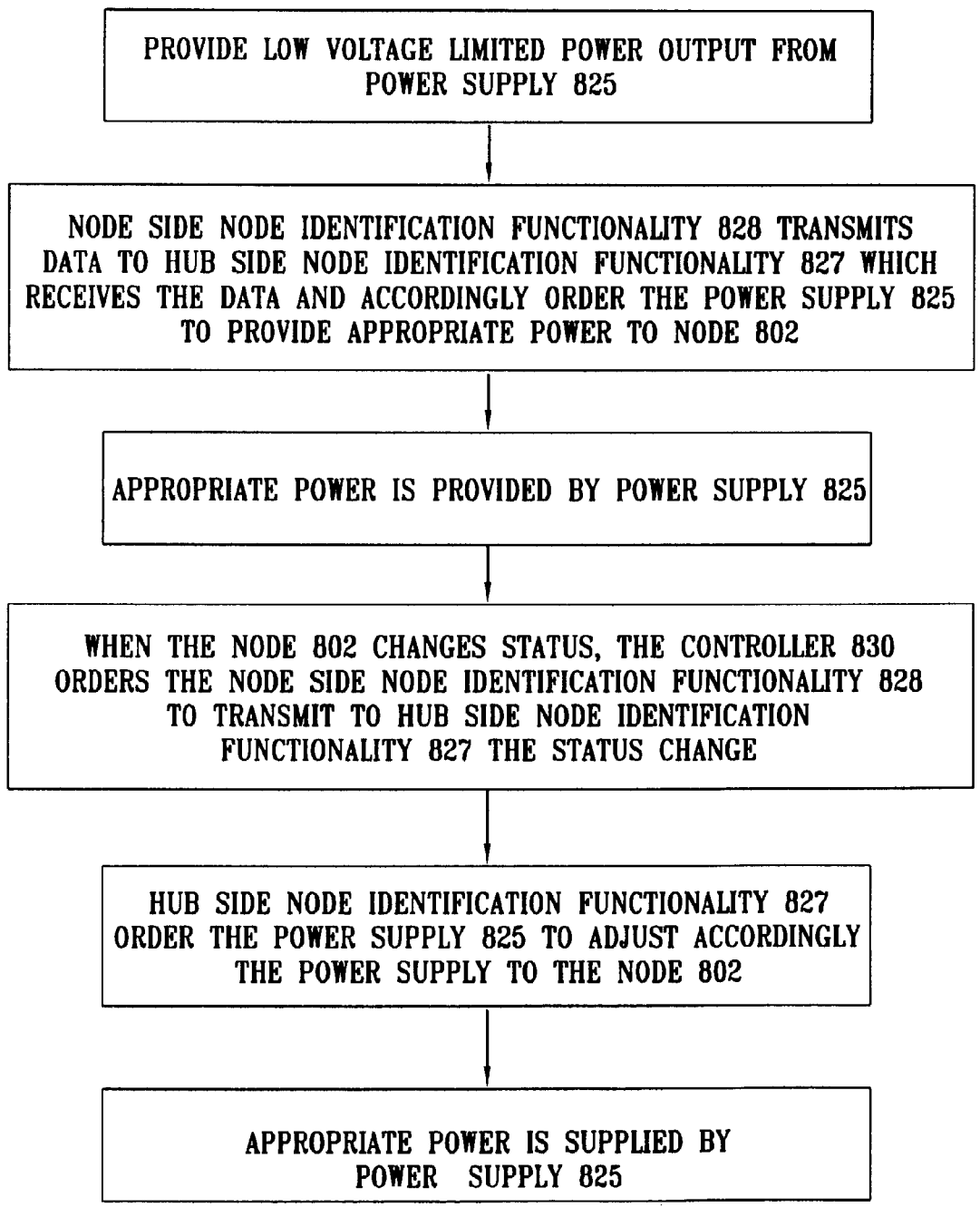
FIG. 9 is a simplified flow chart illustrating a mode of operation of the embodiment of FIG. 8.

Reference is now made to FIG. 8, which is a simplified functional block diagram of a data communication network including a power distribution functionality in accordance with another preferred embodiment of the present invention and to FIG. 9 which is a simplified flow chart illustrating operation of the embodiment of FIG. 8.

As seen in FIG. 8, the data communication network preferably includes a hub side 800 and a plurality of nodes 802 which are connected to the hub side 800 via network connections 804, typically including four parallel twisted pairs of copper wire, as shown, in accordance with ANSI Standard ANSI/EIA/TIA 568A. In accordance with a preferred embodiment of the present invention, nodes 802 may comprise conventional communication network nodes such as computers, modems and printers and may additionally or alternatively comprise less conventional communication network nodes, such as a fax machine node, designated by reference numeral 806, a web camera node, designated by reference numeral 808, a paging loudspeaker node, designated by reference numeral 810, an alarm sensor node, designated by reference numeral 812, an access control node, designated by reference numeral 814, a portable computer node 816, an IP telephone node 818 and any other suitable device which may be beneficially controlled and/or powered by a communication network.

The data communication network includes a power supply 825 which may or may not be at the hub side for providing power to individual nodes 802 via the network connections 804. When the power supply 825 is at the hub side, it may or may not be located at a hub 826 or may be partially at the hub 826.

In accordance with a preferred embodiment of the present invention there is provided hub side node identification functionality 827 which preferably operates in conjunction with node side node identification functionality 828. Hub side node identification functionality 827 may or may not be located at hub 826 or may be partially located at the hub 826. Hub side node identification functionality 827 may or may not be located at power supply 825 or may be partially located at power supply 825.

It is a particular feature of the present invention that the node identification functionality is employed for governing the supply of electrical power from power supply 825 to individual nodes 802 via the network connections 804.

One important application of the node identification functionality is to prevent inappropriate supply of power to inappropriate nodes. An important application of dynamic node identification functionality, which may be in addition or alternative to the above application, is supplying electrical power to individual nodes based on their current status.

The node identification functionality 828 may employ active or passive node side identification functionality, which transmits an identification indication to hub side identification functionality 827. The node identification functionality 828 may be static, in that the same identification is always provided by the same node, or dynamic, in which the identification of a node changes based on its current status.

Thus, for example, depending on the operational status of the web camera node 808, such as whether it is in a sleep mode, it may require or not require power and depending on the operational status of the access control node 814 it may require different voltages. It is thus appreciated that each such node has a different identification for each applicable status thereof, in order to provide a dynamic supply of power thereto.

The dynamic node identification functionality is typically achieved through the use of a CPU or other status responsive controller 830 which supplies a dynamic input to node identification functionality 828.

As seen also in FIG. 9, after appropriate power is provided to the node, once the node changes status, the controller 830 and the node identification functionality respond accordingly in order to provide appropriate power to the node.

Active node identification functionality is described hereinabove with reference to FIGS. 2 and 6, while passive node identification functionality is described hereinabove with reference to FIGS. 5 and 7.

Node side node identification functionality 828 may or may not be located at node 802 or may be partially located at the node 802.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

What is claimed is:

1. A data communications network comprising:
   at least one hub;
   a plurality of nodes connected via network connections to said at least one hub,
      each of said network connections comprising at least one twisted pair,
      each of said nodes comprising a node-resident node identification functionality comprising a precise resistor operatively connected to said at least one twisted pair, said precise resistor having no function in the node other than as part of said node-resident node identification functionality; and
   a power distribution subsystem operative to provide at least some power to at least some of said plurality of nodes via at least some of said network connections, said power distribution subsystem including:
      a node identification functionality providing identification of nodes at least partially by detecting a unique relationship between voltage and current associated with said precise resistor via said at least one twisted pair of said some of said plurality of network connections in order to enable an appropriate supply of power to individual nodes; and
      a power supply responsive to said node identification functionality to supply power to said at least some of said plurality of nodes via said at least one twisted pair of said some of said network connections.

2. A data communications network according to claim 1 and also comprising node-specific power allocation functionality, which is operative, responsive to an output from said node identification functionality, to provide power only to nodes identified to be appropriate for receiving power via said at least some of said network connections, thereby to prevent inappropriate supply of power to inappropriate nodes.

3. A data communications network according to claim 1 and also comprising node-specific power allocation functionality, which is operative, responsive to an output from said node identification functionality, to provide power to nodes in accordance with a predetermined priority.

4. A data communications network according to claim 1 and wherein said supplied power is provided over said at least one twisted pair, and said node identification functionality employs a plurality of voltage levels at a plurality of times along said at least one twisted pair.

5. A data communication network according to claim 1, wherein said at least some of said plurality of nodes being supplied power are operative to operatively disconnect said precise resistor from said at least one twisted pair after said identification.

6. A data communication network according to claim 1, wherein said node-resident node identification functionality provides one of plurality of possible outputs, each of said plurality of possible outputs being associated with a respective required level of power.

7. A data communication network according to claim 4, wherein said plurality of voltage levels are of a single polarity.

8. A data communications network comprising:
   at least one hub;
   a plurality of nodes connected via network connections to said at least one hub;
   a power distribution subsystem operative to provide at least some power to at least some of said plurality of nodes via at least some of said network connections, said power distribution subsystem including:
      a node identification functionality providing identification of more than two types of nodes via said at least some of said plurality of network connections in order to fulfill more than two different power requirements corresponding to said more than two types of nodes;
      each of said plurality of nodes comprising a node-resident node identification functionality associated with said node identification functionality, said node-resident node identification functionality having no function in the node other than as part of said node-resident node identification functionality, wherein said node-resident node identification functionality is disabled following operation thereof; and
      a power supply responsive to said node identification functionality and supplying power to said at least some of said plurality of nodes via at least some of said network connections.

9. A data communication network according to claim 8, wherein said node-resident node identification functionality comprises a precise resistor.

10. A data communications network according to claim 9, and wherein said node-resident node identification functionality is periodically enabled following disabling thereof.

11. A data communication network according to claim 8, wherein said node-resident node identification functionality comprises an electrical switch.

12. A data communication network according to claim 8, wherein said power supply is operative to supply power in accordance with a selected power level from among a plurality of power levels, said selected power level being selected in accordance with said node-resident node identification functionality.

* * * * *

UNITED STATES PATENT AND TRADEMARK OFFICE
CERTIFICATE OF CORRECTION

PATENT NO.       : 6,985,713 B2  
APPLICATION NO. : 10/198831  
DATED            : January 10, 2006  
INVENTOR(S)      : Lehr et al.

It is certified that error appears in the above-identified patent and that said Letters Patent is hereby corrected as shown below:

On Title page (item 30)

Foreign Application Priority Data

Jan. 18, 2001  (PCT)  PCT/IL01/00046

Signed and Sealed this

Fifth Day of September, 2006

JON W. DUDAS  
*Director of the United States Patent and Trademark Office*